Mar. 13, 1923.
W. A. DENEHIE
REMOVABLE BODY MECHANISM FOR TRUCKS
Filed Aug. 15, 1921    3 sheets-sheet 2
1,448,057
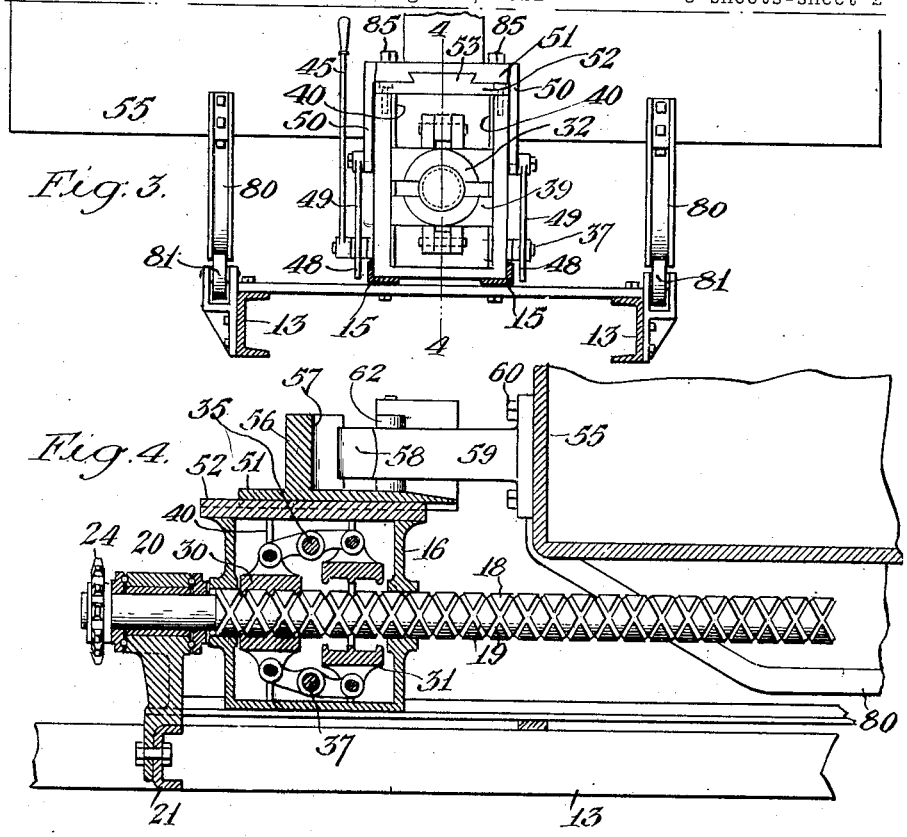
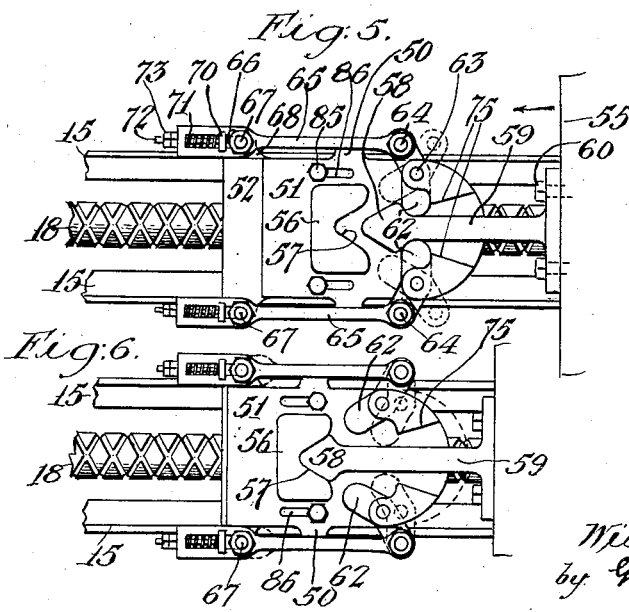
Inventor
William A. Denehie
by Graham and Harris
Attorneys Mar. 13, 1923.
W. A. DENEHIE
1,448,057
REMOVABLE BODY MECHANISM FOR TRUCKS
Filed Aug. 15, 1921
3 sheets-sheet 3
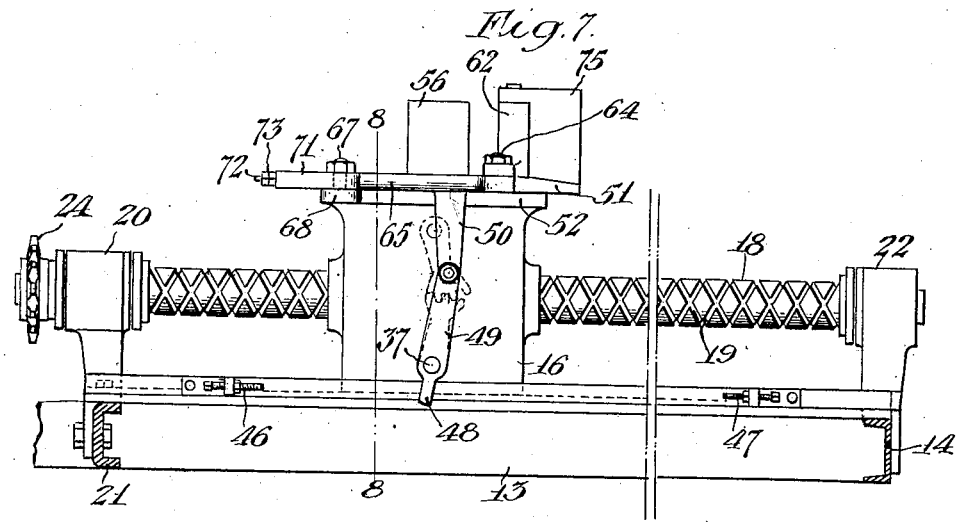
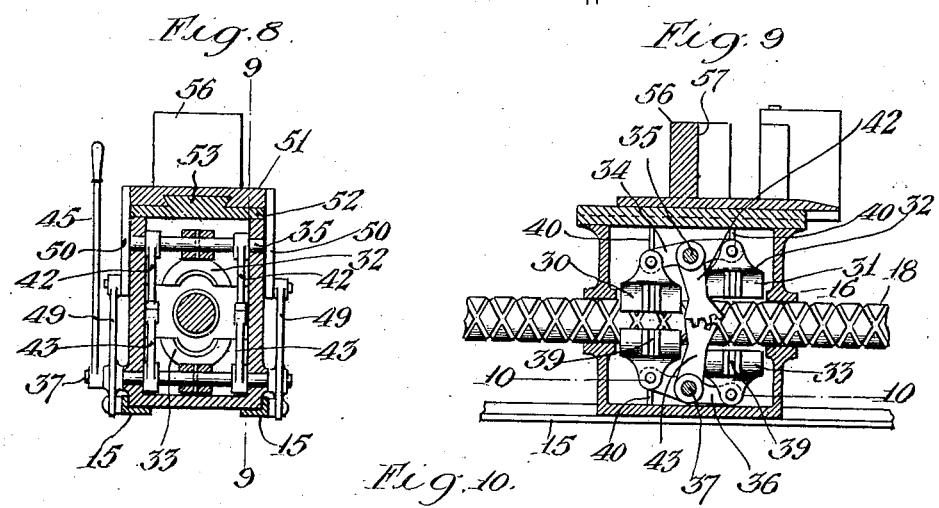
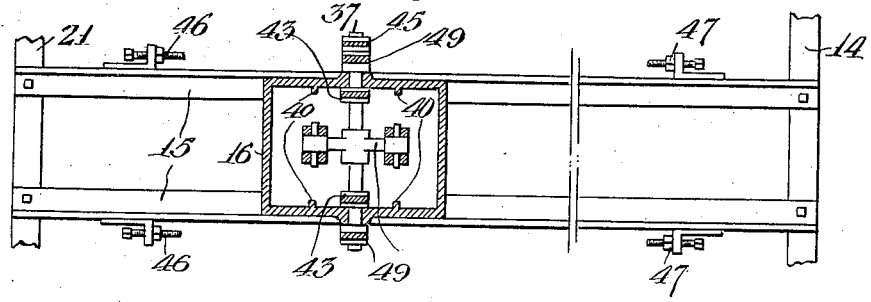
Inventor
William A. Denehie
by Graham Harris
Attorneys.

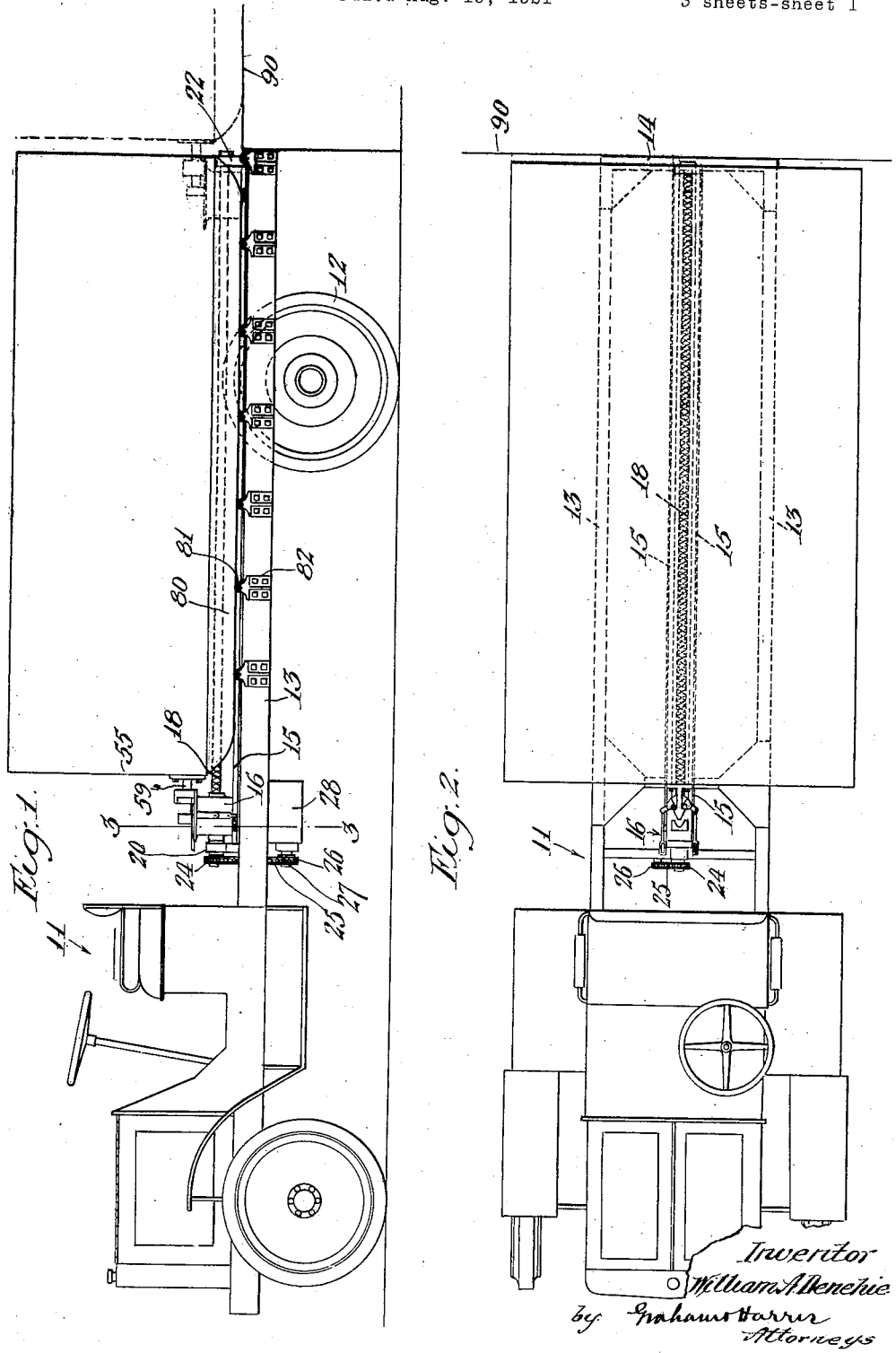
Mar. 13, 1923.
W. A. DENEHIE
REMOVABLE BODY MECHANISM FOR TRUCKS
Filed Aug. 15, 1921
1,448,057
3 sheets-sheet 1

Patented Mar. 13, 1923.

1,448,057

UNITED STATES PATENT OFFICE.

WILLIAM A. DENEHIE, OF LOS ANGELES, CALIFORNIA.

REMOVABLE-BODY MECHANISM FOR TRUCKS.

Application filed August 15, 1921. Serial No. 492,408.

*To all whom it may concern:*

Be it known that I, WILLIAM A. DENEHIE, a citizen of the United States, residing at Los Angeles, in the county of Los Angeles and State of California, have invented a new and useful Removable-Body Mechanism for Trucks, of which the following is a specification.

My invention relates to the loading and unloading of vehicles, being more particularly a mechanism designed for use on a truck whereby a removable body may be moved from a platform to the truck or moved from the truck to the platform.

The principal object of my invention is to produce an apparatus of the class described of simple form and operation which may be readily manipulated to either load or unload the body from the truck.

Other objects and advantages will appear hereinafter in the following specification and drawings.

Referring to the drawings which are for illustrative purposes only,

Fig. 1 is a side elevation of a truck showing mechanism embodying a form of my invention.

Fig. 2 is a plan view of the truck shown in Fig. 1.

Fig. 3 is an enlarged cross sectional view on line 3—3 of Fig. 1.

Fig. 4 is a longitudinal sectional view on line 4—4 of Fig. 3.

Fig. 5 is a plan view of a portion of the device shown in Fig. 4 in the position when the body is being loaded on the truck.

Fig. 6 is a view similar to Fig. 5 showing the parts in a position assumed when the body is being unloaded from the truck.

Fig. 7 is a side elevation of the apparatus shown in Fig. 4.

Fig. 8 is a cross sectional view on line 8—8 of Fig. 7.

Fig. 9 is a sectional view on line 9—9 of Fig. 8, and

Fig. 10 is a sectional plan view on line 10—10 of Fig. 9.

In the drawing, 11 designates a truck chassis, 12 the wheels and 13 the side frame consisting in the form shown of channel bars connected at their rear ends by means of an end bar 14. Supported on the chassis are two longitudinally extending angle irons 15 forming a stationary track upon which is slidably supported a carriage 16. Longitudinally extending above the frame of the truck is a shaft 18 provided with right and left hand threads 19 cut therein. The forward end of the shaft 18 is mounted in a bearing bracket 20 supported on and attached to a cross bar 21 and the rear end of the shaft 18 is mounted in a bearing bracket 22 supported on and secured to the end bar 14. Mounted upon the forward end of the shaft 18 is a sprocket 24 driven by means of a chain 25 from a sprocket 26 on a shaft 27 driven from the gear case 28, the driving of such shaft 27 from the gear case being controlled by any suitable controlling mechanism, not shown.

The shaft 18 extends freely through the carriage 16 which houses a right hand threaded nut or gripping mechanism 30 and a left hand threaded nut or gripping mechanism 31 arranged to engage the shaft 18 as hereinafter described. Each nut consists of two parts or halves, an upper part 32 and a lower part 33, the upper part 32 being mounted on a rock arm 34 mounted on a shaft 35, and the lower part 33 being mounted on a rock arm 36 mounted on a shaft 37, the shafts 35 and 37 being mounted in the carriage 16. Each part of the nuts 30 and 31 is provided with vertically extending guides 39 which engage ribs 40 formed on the inside of the carriage to insure proper engagement of the nuts with the shaft 18.

To insure alternate engagement and proper coordination of the nuts with the shaft, the shafts 35 and 37 are provided with segments 42 and 43, respectively, which mesh with each other as is clearly shown in Figs. 8 and 9.

The nuts 30 and 31 are primarily controlled by means of a hand lever 45 secured to the shaft 37 from which motion is transmitted to the shaft 35 by means of the segments 42 and 43 heretofore referred to.

Means are provided to automatically limit the travel of the carriage on the track 15 which consist of adjustable stops 46 and 47 mounted on the track which stops are arranged in the path of lugs 48 formed on levers 49 mounted and fixed to the shaft 37.

The upper ends of the levers 49 are pivotally connected to arms 50 which form a part or are rigidly secured to a sliding plate 51 which is slidably mounted on the cover plate 52 of the carriage 16, such cover plate being provided with a dove tail guide 53 which engages in a corresponding groove formed in the underside of the sliding plate 51.

The sliding plate 51 constitutes one element of a coupling device by means of which the carriage is detachably secured to the body 55 of the truck. The plate 51 is provided with a lug 56 having a V-shaped notch 57 formed therein to receive the V-shaped head 58 on a bar 59 secured to the front end of the body 55 by means of suitable bolts 60, such bar forming a coupling member.

Pivotally mounted on the sliding plate 51 are two oppositely disposed jaws 62, such jaws being mounted on bolts 63 and having their outer ends pivotally connected by means of pins or bolts 64 with resetting rods 65. The rods 65 are each provided with a longitudinally extending slot 66 which receives a pin 67 mounted on ears 68 formed on the carriage 16. Mounted in each slot 66 is a sliding block 70 elastically held in forward position by means of a coiled spring 71, the block being mounted on a bolt 72 slidable through the end of the rod and provided with nuts 73. The jaws 62 engage behind the shouldered head 58 of the bar 59, the bar being guided into proper position with respect to the jaws by means of guide lugs 75, the upper portions of which extend over the jaws 62 and form upper bearings for the bolts 63. These lugs 75 also form abutments against which the jaws 62 lie when in operative position.

The body 55 may be of any convenient form and material and is provided with two longitudinally extending tracks 80 formed of channel bars which engage over a series of body supporting rollers 81 mounted in brackets 82 fixed to the frame of the truck. The tracks 80 are arranged under the body in such a manner as to permit the body to clear the shaft 18 and bearing 22.

In the position shown in Fig. 1 the body is shown in full lines on the truck and in dotted lines upon a loading platform 90 which is of proper height to permit the body to be moved therefrom to the rollers 81 on the truck.

Assuming that the body is on the platform in position to be loaded on the truck and that the carriage 16 is moving rearwardly through the medium of engagement of the proper nut with the rotating shaft 18. The jaws 62 are swung apart by the head 58 on the bar 59 allowing the head to pass through the jaws, the jaws during such operation assuming the position shown in dotted lines in Fig. 5. This movement of the jaws has operated the resetting rods 65, the blocks 70 through engagement with the bolts 67 compressing the springs 71. When the head 58 has cleared the jaws, the springs 71 cause the rods 65 to move forwardly, thereby swinging the jaws into the dotted line position shown in Fig. 6, that is, with their inner ends in the path of the head 58. The nut operating to move the carriage rearwardly is then moved out of engagement with the shaft and the other nut brought into engagement therewith which moves the carriage forwardly, the shouldered portion of the head 58 engaging the jaws 62 and swinging them into closed position against the lugs 75. Continued forward movement of the carriage pulls the body onto the truck, the tracks 80 on the body running on the wheels 81. When the body is in place on the truck, the driving connection through the sprocket 24 is thrown out of engagement in the gear case and the movement of the carriage stopped.

When the unloading operation takes place the hand lever 45 is operated to disengage the nut which performs the loading operation and places the opposite nut in engagement. The shaft 18 being started the carriage starts to move rearwardly, the head 58 of the bar 59 being received in the notch 57 of the lug 56, the sliding plate moving from the position shown in Fig. 5 to that shown in Fig. 6 opening the jaws 62, the movement of the plate 51 on the carriage being limited by bolts 85 mounted on the carriage which extend through slots 86 in the plate 51.

The carriage in its movement rearwardly pushes the body onto the platform clear of the truck, the rearward movement of the carriage being stopped by lug 48 coming into contact with stops 47. This engagement through the medium of the connections heretofore described moves the nuts 30 and 31 into neutral position out of engagement with the feed screw or shaft 18. The jaws 62 being in open position allow the head 58 of the coupling to pass free of the jaws allowing the unloaded body to be manually moved on the platform and another body placed in position to be loaded on the truck. The loading operation is started by moving the body on the platform so that the head 58 is between the jaws 62, the hand lever 45 is moved to bring the nut 30 into engagement with the feed screw or shaft 18 simultaneously closing the jaws 62 behind the head 58, the rotation of the shaft 18 drawing the body on the truck as heretofore described.

I claim as my invention:

1. A truck body loading and unloading device comprising a track secured to the truck frame, a carriage slidably mounted on said track, a right and left hand threaded longitudinally extending shaft mounted on said frame extending through said carriage, right and left hand nuts in said carriage arranged to alternately engage said shaft, each nut comprising an upper part and a lower part, upper and lower shafts mounted in said carriage, a rock arm on the upper shaft pivotally connected to the upper parts of said nuts, a rock arm on the lower shaft pivotally connected to the lower parts of said nuts, segments on said shafts meshing with each other, a hand lever for operating one of said last named shafts, means for detachably connecting a truck body to said carriage, and means for driving said threaded shaft.

2. A truck body loading and unloading device comprising a track secured to the truck frame, a carriage slidably mounted on said track, a right and left hand threaded longitudinally extending shaft mounted on said frame extending through said carriage, right and left hand nuts in said carriage arranged to alternately engage said shaft, each nut comprising an upper part and a lower part, upper and lower shafts mounted in said carriage, a rock arm on the upper shaft pivotally connected to the upper parts of said nuts, a rock arm on the lower shaft pivotally connected to the lower parts of said nuts, segments on said shafts meshing with each other, a hand lever for operating one of said last named shafts, means for detachably connecting a truck body to said carriage, and means for driving said threaded shaft, and means for automatically limiting the movement of said carriage on said track.

3. A truck body loading and unloading device comprising a track secured to the truck frame, a carriage slidably mounted on said track, a right and left hand threaded shaft extending through said carriage, right and left hand nuts in said carriage arranged to alternately engage said shaft, means for manually operating said nuts, a truck body, a coupling member on said body and means on said carriage for detachably engaging said coupling means.

4. A truck body loading and unloading device comprising a track secured to the truck frame, a carriage slidably mounted on said track, a right and left hand threaded shaft extending through said carriage, right and left hand nuts in said carriage arranged to alternately engage said shaft, means for operating said nuts, coupling means mounted on said carriage, a truck body, coupling means on said body arranged to cooperate with the coupling means on said carriage.

5. A truck body loading and unloading device comprising a track secured to the truck frame, a carriage slidably mounted on said track, a right and left hand threaded shaft extending through said carriage, right and left hand nuts in said carriage arranged to alternately engage said shaft, means for operating said nuts, a pair of movable jaws on said carriage, and means on said body engaged by said jaws.

6. A truck body loading and unloading device comprising a track secured to the truck frame, a carriage slidably mounted on said track, a right and left hand threaded shaft extending through said carriage, right and left hand nuts in said carriage arranged to alternately engage said shaft, means for operating said nuts, a headed member on said body, and a pair of jaws on said carriage arranged to engage said headed member.

7. A truck body loading and unloading device comprising a track secured to the truck frame, a carriage slidably mounted on said track, a right and left hand threaded shaft extending through said carriage, right and left hand nuts in said carriage arranged to alternately engage said shaft, means for operating said nuts, a headed member on said body, and a pair of jaws on said carriage arranged to engage said headed member, and means for yieldingly holding said jaws in the path of said headed member.

8. A truck body loading and unloading device comprising a track secured to the truck frame, a carriage slidably mounted on said track, a right and left hand threaded shaft extending through said carriage, right and left hand nuts in said carriage arranged to alternately engage said shaft, nut actuating mechanism whereby said nuts are moved into and out of engagement with said shaft, manual means for operating said nut operating mechanism and means for automatically limiting the movement of the carriage on said truck.

9. An apparatus of the class described comprising in combination, a body coupling member, a longitudinally movable carriage on the truck, a pair of jaws on said carriage, and means for operating said jaws to detachably engage said coupling member.

10. In combination, a truck and movable body therefor, a coupling member on the body, a pair of movable jaws on the truck arranged to detachably engage said coupling member, and means for moving said jaws longitudinally on said truck.

11. In combination, a truck and movable body therefor, a feed screw on the truck, a carriage operated by said feed screw, a pair of jaws pivotally mounted on said carriage and a coupling member arranged to enter between said jaws.

12. In combination, a truck and movable body therefor, a feed screw on said truck, a longitudinally movable carriage, a nut in said carriage arranged to engage said screw, means for moving said nut into operative and inoperative engagement with said screw, a coupling member on said body and engaging means for said coupling member on said carriage.

13. In combination, a truck and movable body therefor, a right and left hand threaded feed screw on said truck, a carriage, right and left hand nuts on said screw mounted in said carriage, jaws on said carriage, and coupling means on said body co-operating with said jaws.

14. In combination, a truck and movable body therefor, a right and left hand threaded feed screw on said truck, a carriage, right and left hand nuts on said screw mounted in said carriage, jaws on said carriage, and coupling means on said body cooperating with said jaws, means for disengaging said jaws from said coupling means and means on said carriage arranged to engage the end of said coupling means to push said body thereby.

In testimony whereof, I have hereunto set my hand at Los Angeles, California, this 10th day of August, 1921.

WILLIAM A. DENEHIE.